United States Patent
Kim et al.

(10) Patent No.: US 8,481,637 B2
(45) Date of Patent: Jul. 9, 2013

(54) CO-EXTRUDABLE THERMOPLASTIC ELASTOMER COMPOUND FOR BLOW MOLDED PLASTIC ARTICLES

(75) Inventors: Sehyun Kim, McHenry, IL (US); Joseph Kutka, Williams Bay, WI (US); Daniel Paris, Auvers sur Oise (FR); Albert Deby, Sart-Lez-Spa (BE)

(73) Assignee: PolyOne Corporation, Avon Lake, OH (US)

( * ) Notice: Subject to any disclaimer, the term of this patent is extended or adjusted under 35 U.S.C. 154(b) by 142 days.

(21) Appl. No.: 13/084,395

(22) Filed: Apr. 11, 2011

(65) Prior Publication Data

US 2011/0256332 A1    Oct. 20, 2011

Related U.S. Application Data

(60) Provisional application No. 61/323,975, filed on Apr. 14, 2010.

(51) Int. Cl.
*C08K 5/00* (2006.01)
*C08L 53/00* (2006.01)

(52) U.S. Cl.
USPC .......................................... 524/515; 524/505

(58) Field of Classification Search
USPC ........................................................ 524/515
See application file for complete search history.

(56) References Cited

U.S. PATENT DOCUMENTS

| | | | | |
|---|---|---|---|---|
| 6,027,776 | A * | 2/2000 | Mueller | 428/35.2 |
| 7,714,071 | B2 * | 5/2010 | Hoenig et al. | 525/191 |
| 2003/0232213 | A1 | 12/2003 | Shepler et al. | |

* cited by examiner

*Primary Examiner* — Hui Chin
(74) *Attorney, Agent, or Firm* — John H. Hornickel

(57) ABSTRACT

A thermoplastic elastomer (TPE) is disclosed which is a combination of a non-elastomeric polyolefin and two different non-crosslinked elastomers and optional softening oil. The TPE can be used as an outer layer on at least a portion of the outer surface of a co-extruded, blow-molded polyolefin plastic article to provide a "soft touch" gripping surface on the article.

19 Claims, No Drawings

US 8,481,637 B2

CO-EXTRUDABLE THERMOPLASTIC ELASTOMER COMPOUND FOR BLOW MOLDED PLASTIC ARTICLES

CLAIM OF PRIORITY

This application claims priority from U.S. Provisional Patent Application Ser. No. 61/323,975 bearing and filed on Apr. 14, 2010, which is incorporated by reference.

FIELD OF THE INVENTION

This invention relates to co-extrudable thermoplastic elastomers, polymer compounds which exhibit elasticity while remaining thermoplastic and which also can be co-extruded with polyolefin polymers to make blow-molded plastic articles.

BACKGROUND OF THE INVENTION

The world of polymers has progressed rapidly to transform material science from wood and metals of the 19$^{th}$ Century to the use of thermoset polymers of the mid-20$^{th}$ Century to the use of thermoplastic polymers of the later 20$^{th}$ Century.

Thermoplastic elastomers (TPEs) combine the benefits of elastomeric properties of thermoset polymers, such as vulcanized rubber, with the processing properties of thermoplastic polymers.

Recently, a new type of TPE has become available, namely: ethylene/alpha-olefin interpolymers as disclosed in PCT Patent Publications WO 2006/101966; WO 2006/102155; WO 2006/101999; WO 2006/101928; and WO 2006/101924 all filed by Dow Global Technologies and all incorporated by reference as if fully rewritten herein.

TPEs are particularly suitable for providing a "soft touch" manual gripping surface on tools, toothbrushes, and other handheld items. Most often, these TPEs are co-molded with a hard, inelastic thermoplastic in a technique called two-component injection molding.

United States Patent Application Publication US2003/0232213 (Shepler et al.) (abandoned) disclosed a multiple layer reusable plastic container made by, for example, co-extrusion blow molding techniques. One outer layer disclosed by Shepler et al. was a thermoplastic elastomer.

SUMMARY OF THE INVENTION

What the art needs is a "soft touch" gripping surface on at least a portion of a blow molded thermoplastic article.

The present invention solves the problem by formulating a TPE that can be co-extruded with a blow moldable polyolefin and then subjected to blow molding to provide that "soft touch" gripping surface on at least a portion of the blow molded thermoplastic article.

One aspect of the invention is a co-extrudable thermoplastic elastomer compound, comprising: (a) a non-elastomeric polyolefin; (b) a first non-crosslinked elastomer; (c) a second non-crosslinked elastomer; and (d) optionally, a softening oil, wherein the compound has a weight percent ratio of elastomers to oil, when present, of at least 1.5:1.

Another aspect of the invention is a blow molded thermoplastic article comprising a layer of polyolefin having an outer surface and a layer of the compound covering at least a portion of the outer surface of the polyolefin layer.

Features of the invention will become apparent with reference to the following embodiments.

EMBODIMENTS OF THE INVENTION

Thermoplastic Elastomer Compound

The TPEs of the present invention are a mixture of a non-elastomeric polyolefin and two different non-crosslinked elastomers. The non-crosslinked elastomers are likely the continuous phase, with the non-elastomeric polyolefin comprising the discontinuous phase. Most TPEs commercially available fit that description. The non-crosslinked elastomers are both a styrene block copolymer (SBC) and an olefin block copolymer (OBC).

SBC

Non-limiting examples of SBC include styrene-ethylene-butylene-styrene, styrene-ethylene-propylene-styrene, styrene-ethylene-ethylene/propylene-styrene, styrene-isobutylene-styrene, styrene-butadiene-styrene, styrene-isoprene-styrene, and combinations thereof. These examples of SBC may or may not be maleated but have weight average molecular weights in excess of 75,000 and preferably in excess of 200,000. Of possible SBC candidates, styrene-ethylene-butylene-styrene (SEBS) is particularly useful because the olefinic mid-block is capable of holding large amounts of softening oil.

Commercially available grades of these SBC polymers are made by Kraton Polymers (Houston, Tex., USA) and marketed using the Kraton brand. Of the preferred SEBS, those presently preferred grades are Kraton G1651HU, Kraton G1650, Kraton G1652, and Kraton G1654H (a linear triblock copolymer based on styrene and ethylene/butylene with a polystyrene content between 29.5 and 33.0, a specific gravity of 0.92, and a Shore A hardness between 60 to 73).

OBC

The PCT publications identified in the Background above recite many attributes and features of these new ethylene/alpha-olefin interpolymers, also known in the industry as olefin block copolymers or OBC.

Without departing from reliance on the original documentation about these new type of thermoplastic elastomers as contained in the PCT publications identified above, briefly, they can be characterized as follows, in a recitation from PCT Publication WO/2006/101966:

"Interpolymer" means a polymer prepared by the polymerization of at least two different types of monomers. The generic term "interpolymer" includes the term "copolymer" (which is usually employed to refer to a polymer prepared from two different monomers) as well as the term "terpolymer" (which is usually employed to refer to a polymer prepared from three different types of monomers). It also encompasses polymers made by polymerizing four or more types of monomers.

The term "ethylene/α-olefin interpolymer" generally refers to polymers comprising ethylene and an α-olefin having 3 or more carbon atoms. Preferably, ethylene comprises the majority mole fraction of the whole polymer, i.e., ethylene comprises at least about 50 mole percent of the whole polymer. More preferably ethylene comprises at least about 60 mole percent, at least about 70 mole percent, or at least about 80 mole percent, with the substantial remainder of the whole polymer comprising at least one other comonomer that is preferably an α-olefin having 3 or more carbon atoms. For many ethylene/octene copolymers, the preferred composition comprises an ethylene content greater than about 80 mole percent of the whole polymer and an octene content of from about 10 to about 15, preferably from about 15 to about 20 mole percent of the whole polymer. In some embodiments, the ethylene/α-olefin interpolymers do not include those produced in low yields or in a minor amount or as a by-product of a chemical process. While the ethylene/α-olefin interpolymers can be blended with one or more polymers, the as-produced ethylene/α-olefin interpolymers are substantially pure and often comprise a major component of the reaction product of a polymerization process.

The term "crystalline" if employed, refers to a polymer or a segment that possesses a first order transition or crystalline melting point (Tm) as determined by differential scanning calorimetry (DSC) or equivalent technique. The term may be used interchangeably with the term "semicrystalline". The term "amorphous" refers to a polymer lacking a crystalline melting point as determined by differential scanning calorimetry (DSC) or equivalent technique.

The term "multi-block copolymer" or "segmented copolymer" refers to a polymer comprising two or more chemically distinct regions or segments (also referred to as "blocks") preferably joined in a linear manner, that is, a polymer comprising chemically differentiated units which are joined end-to-end with respect to polymerized ethylenic functionality, rather than in pendent or grafted fashion. In a preferred embodiment, the blocks differ in the amount or type of comonomer incorporated therein, the density, the amount of crystallinity, the crystallite size attributable to a polymer of such composition, the type or degree of tacticity (isotactic or syndiotactic), regio-regularity or regio-irregularity, the amount of branching, including long chain branching or hyper-branching, the homogeneity, or any other chemical or physical property. The multi-block copolymers are characterized by unique distributions of both polydispersity index (PDI or Mw/Mn), block length distribution, and/or block number distribution due to the unique process making of the copolymers. More specifically, when produced in a continuous process, the polymers desirably possess PDI from about 1.7 to about 8, preferably from about 1.7 to about 3.5, more preferably from about 1.7 to about 2.5, and most preferably from about 1.8 to about 2.5 or from about 1.8 to about 2.1. When produced in a batch or semi-batch process, the polymers possess PDI from about 1.0 to about 2.9, preferably from about 1.3 to about 2.5, more preferably from about 1.4 to about 2.0, and most preferably from about 1.4 to about 1.8. It is noted that "block(s)" and "segment(s)" are used herein interchangeably.

In the following description, all numbers disclosed herein are approximate values, regardless whether the word "about" or "approximate" is used in connection therewith. They may vary by 1 percent, 2 percent, 5 percent, or, sometimes, 10 to 20 percent. Whenever a numerical range with a lower limit, RL and an upper limit, Ru, is disclosed, any number falling within the range is specifically disclosed. In particular, the following numbers within the range are specifically disclosed: R=RL+ k*(Ru–RL), wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed.

Embodiments of the invention provide a new class of ethylene/α-olefin block interpolymers (hereinafter "inventive polymer", "ethylene/α-olefin interpolymers", or variations thereof). The ethylene/α-olefin interpolymers comprise ethylene and one or more copolymerizable α-olefin comonomers in polymerized form, characterized by multiple blocks or segments of two or more polymerized monomer units differing in chemical or physical properties. That is, the ethylene/α-olefin interpolymers are block interpolymers, preferably multi-block interpolymers or copolymers. The terms "interpolymer" and copolymer" are used interchangeably herein. In some embodiments, the multi-block copolymer can be represented by the following formula:

$$(AB)_n$$

where n is at least 1, preferably an integer greater than 1, such as 2, 3, 4, 5, 10, 15, 20, 30, 40, 50, 60, 70, 80, 90, 100, or higher, "A" represents a hard block or segment and "B" represents a soft block or segment. Preferably, As and Bs are linked in a linear fashion, not in a branched or a star fashion.

"Hard" segments refer to blocks of polymerized units in which ethylene is present in an amount greater than 95 weight percent, and preferably greater than 98 weight percent. In other words, the comonomer content in the hard segments is less than 5 weight percent, and preferably less than 2 weight percent. In some embodiments, the hard segments comprises all or substantially all ethylene. "Soft" segments, on the other hand, refer to blocks of polymerized units in which the comonomer content is greater than 5 weight percent, preferably greater than 8 weight percent, greater than 10 weight percent, or greater than 15 weight percent. In some embodiments, the comonomer content in the soft segments can be greater than 20 weight percent, greater than 25 eight percent, greater than 30 weight percent, greater than 35 weight percent, greater than 40 weight percent, greater than 45 weight percent, greater than 50 weight percent, or greater than 60 weight percent.

In some embodiments, A blocks and B blocks are randomly distributed along the polymer chain. In other words, the block copolymers usually do not have a structure like:

AAA-AA-BBB—BB

In other embodiments, the block copolymers usually do not have a third type of block. In still other embodiments, each of block A and block B has monomers or comonomers randomly distributed within the block. In other words, neither block A nor block B comprises two or more segments (or sub-blocks) of distinct composition, such as a tip segment, which has a different composition than the rest of the block.

In one aspect, the ethylene/α-olefin interpolymers used in embodiments of the invention have a Mw/Mn from about 1.7 to about 3.5 and at least one melting point, Tm, in degrees Celsius and density, d, in grams/cubic centimeter, wherein the numerical values of the variables correspond to the relationship:

$$Tm > -2002.9 + 4538.5(d) - 2422.2(d)2, \text{ and preferably}$$

$$Tm > -6288.1 + 13141(d) - 6720.3(d)2, \text{ and more preferably}$$

$$Tm > 858.91 - 1825.3(d) + 1112.8(d)2.$$

Unlike the traditional random copolymers of ethylene/α-olefins whose melting points decrease with decreasing densities, these interpolymers (represented by diamonds) exhibit melting points substantially independent of the density, particularly when density is between about 0.87 g/cc to about 0.95 g/cc. For example, the melting point of such polymers are in the range of about 110° C. to about 130° C. when density ranges from 0.875 g/cc to about 0.945 g/cc. In some embodiments, the melting point of such polymers are in the range of about 115° C. to about 125° C. when density ranges from 0.875 g/cc to about 0.945 g/cc.

In another aspect, the ethylene/α-olefin interpolymers comprise, in polymerized form, ethylene and one or more α-olefins and are characterized by a ΔT, in degree Celsius, defined as the temperature for the tallest Differential Scanning calorimetry ("DSC") peak minus the temperature for the tallest Crystallization Analysis Fractionation ("CRYSTAF") peak and a heat of fusion in J/g, ΔH, and ΔT and ΔH satisfy the following relationships:

$$\Delta T > -0.1299(\Delta H)+62.81, \text{ and preferably}$$

$$\Delta T > -0.1299(\Delta H)+64.38, \text{ and more preferably}$$

$$\Delta T \geq -0.1299(\Delta H)+65.95,$$

for ΔH up to 130 J/g. Moreover, ΔT is equal to or greater than 48° C. for ΔH greater than 130 J/g. The CRYSTAF peak is determined using at least 5 percent of the cumulative polymer (that is, the peak must represent at least 5 percent of the cumulative polymer), and if less than 5 percent of the polymer has an identifiable CRYSTAF peak, then the CRYSTAF temperature is 30° C., and ΔH is the numerical value of the heat of fusion in J/g. More preferably, the highest CRYSTAF peak contains at least 10 percent of the cumulative polymer.

In yet another aspect, the ethylene/α-olefin interpolymers have a molecular fraction which elutes between 40° C. and 130° C. when fractionated using Temperature Rising Elution Fractionation ("TREF"), characterized in that said fraction has a molar comonomer content higher, preferably at least 5 percent higher, more preferably at least 10 percent higher, than that of a comparable random ethylene interpolymer fraction eluting between the same temperatures, wherein the comparable random ethylene interpolymer contains the same comonomer(s), and has a melt index, density, and molar comonomer content (based on the whole polymer) within 10 percent of that of the block interpolymer. Preferably, the Mw/Mn of the comparable interpolymer is also within 10 percent of that of the block interpolymer and/or the comparable interpolymer has a total comonomer content within 10 weight percent of that of the block interpolymer.

In still another aspect, the ethylene/α-olefin interpolymers are characterized by an elastic recovery, Re, in percent at 300 percent strain and 1 cycle measured on a compression-molded film of an ethylene/α-olefin interpolymer, and has a density, d, in grams/cubic centimeter, wherein the numerical values of Re and d satisfy the following relationship when ethylene/α-olefin interpolymer is substantially free of a cross-linked phase:

$$Re>1481-1629(d); \text{ and preferably}$$

$$Re>1491-1629(d); \text{ and more preferably}$$

$$Re>1501-1629(d); \text{ and even more preferably}$$

$$Re \geq 1511-1629(d).$$

In some embodiments, the ethylene/α-olefin interpolymers have a tensile strength above 10 MPa, preferably a tensile strength >11 MPa, more preferably a tensile strength >13 MPa and/or an elongation at break of at least 600 percent, more preferably at least 700 percent, highly preferably at least 800 percent, and most highly preferably at least 900 percent at a crosshead separation rate of 11 cm/minute.

In other embodiments, the ethylene/α-olefin interpolymers have (1) a storage modulus ratio, G'(25° C.)/G'(100° C.), of from 1 to 50, preferably from 1 to 20, more preferably from 1 to 10; and/or (2) a 70° C. compression set of less than 80 percent, preferably less than 70 percent, especially less than 60 percent, less than 50 percent, or less than 40 percent, down to a compression set of 0 percent.

In still other embodiments, the ethylene/α-olefin interpolymers have a 70° C. compression set of less than 80 percent, less than 70 percent, less than 60 percent, or less than 50 percent. Preferably, the 70° C. compression set of the interpolymers is less than 40 percent, less than 30 percent, less than 20 percent, and may go down to about 0 percent.

In some embodiments, the ethylene/α-olefin interpolymers have a heat of fusion of less than 85 J/g and/or a pellet blocking strength of equal to or less than 100 pounds/foot$^2$ (4800 Pa), preferably equal to or less than 50 lbs/ft$^2$ (2400 Pa), especially equal to or less than 5 lbs/ft$^2$ (240 Pa), and as low as 0 lbs/ft$^2$ (0 Pa).

In other embodiments, the ethylene/α-olefin interpolymers comprise, in polymerized form, at least 50 mole percent ethylene and have a 70° C. compression set of less than 80 percent, preferably less than 70 percent or less than 60 percent, most preferably less than 40 to 50 percent and down to close to zero percent.

In some embodiments, the multi-block copolymers possess a PDI fitting a Schultz-Flory distribution rather than a Poisson distribution. The copolymers are further characterized as having both a polydisperse block distribution and a polydisperse distribution of block sizes and possessing a most probable distribution of block lengths. Preferred multi-block copolymers are those containing 4 or more blocks or segments including terminal blocks. More preferably, the copolymers include at least 5, 10 or 20 blocks or segments including terminal blocks.

In addition, the inventive block interpolymers have additional characteristics or properties. In one aspect, the interpolymers, preferably comprising ethylene and one or more copolymerizable comonomers in polymerized form, are characterized by multiple blocks or segments of two or more polymerized monomer units differing in chemical or physical properties (blocked interpolymer), most preferably a multi-block copolymer, said block interpolymer having a molecular fraction which elutes between 40° C. and 130° C. when fractionated using TREF, characterized in that said fraction has a molar comonomer content higher, preferably at least 5 percent higher, more preferably at least 10 percent higher, than that of a comparable random ethylene interpolymer fraction eluting between the same temperatures, wherein said comparable random ethylene interpolymer comprises the same comonomer(s), and has a melt index, density, and molar comonomer content (based on the whole polymer) within 10 percent of that of the blocked interpolymer. Preferably, the Mw/Mn of the comparable interpolymer is also within 10 percent of that of the blocked interpolymer and/or the comparable interpolymer has a total comonomer content within 10 weight percent of that of the blocked interpolymer.

Comonomer content may be measured using any suitable technique, with techniques based on nuclear magnetic resonance ("NMR") spectroscopy preferred. Moreover, for polymers or blends of polymers having relatively broad TREF curves, the polymer is first fractionated using TREF into fractions each having an eluted temperature range of 10° C. or less. That is, each eluted fraction has a collection temperature window of 10° C. or less. Using this technique, said block interpolymers have at least one such fraction having a higher molar comonomer content than a corresponding fraction of the comparable interpolymer.

In another aspect, the interpolymer is an olefin interpolymer, preferably comprising ethylene and one or more copolymerizable comonomers in polymerized form, characterized by multiple blocks (i.e., at least two blocks) or segments of two or more polymerized monomer units differing in chemical or physical properties (blocked interpolymer), most preferably a multi-block copolymer, said block interpolymer having a peak (but not just a molecular fraction) which elutes between 40° C. and 130° C. (but without collecting and/or isolating individual fractions), characterized in that said peak, has a comonomer content estimated by infra-red spectroscopy when expanded using a full width/half maximum (FWHM) area calculation, has an average molar comonomer content higher, preferably at least 5 percent higher, more preferably at least 10 percent higher, than that of a comparable random ethylene interpolymer peak at the same elution temperature and expanded using a full width/half maximum (FWHM) area calculation, wherein said comparable random ethylene interpolymer has the same comonomer(s) and has a melt index, density, and molar comonomer content (based on the whole polymer) within 10 percent of that of the blocked interpolymer. Preferably, the Mw/Mn of the comparable interpolymer is also within 10 percent of that of the blocked interpolymer and/or the comparable interpolymer has a total comonomer content within 10 weight percent of that of the blocked interpolymer. The full width/half maximum (FWHM) calculation is based on the ratio of methyl to methylene response area $[CH_3/CH_2]$ from the ATREF infra-red detector, wherein the tallest (highest) peak is identified from the base line, and then the FWHM area is determined. For a distribution measured using an ATREF peak, the FWHM area is defined as the area under the curve between $T_1$ and $T_2$, where $T_1$ and $T_2$ are points determined, to the left and right of the ATREF peak, by dividing the peak height by two, and then drawing a line horizontal to the base line, that intersects the left and right portions of the ATREF curve. A calibration curve for comonomer content is made using random ethylene/α-olefin copolymers, plotting comonomer content from NMR versus FWHM area ratio of the TREF peak. For this infra-red method, the calibration curve is generated for the same comonomer type of interest. The comonomer content of TREF peak of the inventive polymer can be determined by referencing this calibration curve using its FWHM methyl:methylene area ratio $[CH_3/CH_2]$ of the TREF peak.

Comonomer content may be measured using any suitable technique, with techniques based on nuclear magnetic resonance (NMR) spectroscopy preferred. Using this technique, said blocked interpolymer has higher molar comonomer content than a corresponding comparable interpolymer.

Preferably, for interpolymers of ethylene and 1-octene, the block interpolymer has a comonomer content of the TREF fraction eluting between 40 and 130° C. greater than or equal to the quantity (−0.2013) T+20.07, more preferably greater than or equal to the quantity (−0.2013) T+21.07, where T is the numerical value of the peak elution temperature of the TREF fraction being compared, measured in ° C.

The multi-block polymers typically comprise various amounts of "hard" and "soft" segments.

"Hard" segments refer to blocks of polymerized units in which ethylene is present in an amount greater than about 95 weight percent, and preferably greater than about 98 weight percent based on the weight of the polymer. In other words, the comonomer content (content of monomers other than ethylene) in the hard segments is less than about 5 weight percent, and preferably less than about 2 weight percent based on the weight of the polymer. In some embodiments, the hard segments comprises all or substantially all ethylene.

"Soft" segments, on the other hand, refer to blocks of polymerized units in which the comonomer content (content of monomers other than ethylene) is greater than about 5 weight percent, preferably greater than about 8 weight percent, greater than about 10 weight percent, or greater than about 15 weight percent based on the weight of the polymer. In some embodiments, the comonomer content in the soft segments can be greater than about 20 weight percent, greater than about 25 weight percent, greater than about 30 weight percent, greater than about 35 weight percent, greater than about 40 weight percent, greater than about 45 weight percent, greater than about 50 weight percent, or greater than about 60 weight percent.

The soft segments can often be present in a block interpolymer from about 1 weight percent to about 99 weight percent of the total weight of the block interpolymer, preferably from about 5 weight percent to about 95 weight percent, from about 10 weight percent to about 90 weight percent, from about 15 weight percent to about 85 weight percent, from about 20 weight percent to about 80 weight percent, from about 25 weight percent to about 75 weight percent, from about 30 weight percent to about 70 weight percent, from about 35 weight percent to about 65 weight percent, from about 40 weight percent to about 60 weight percent, or from about 45 weight percent to about 55 weight percent of the total weight of the block interpolymer. Conversely, the hard segments can be present in similar ranges. The soft segment weight percentage and the hard segment weight percentage can be calculated based on data obtained from DSC or NMR.

From PCT Publication WO 2006/101966 comes additional ways to characterize the interpolymers useful in the present invention:

The ethylene/α-olefin interpolymer comprises polymerized units of ethylene and α-olefin, wherein the interpolymer is characterized by an average block index greater than zero and up to about 1.0 and a molecular weight distribution, Mw/Mn, greater than about 1.3. It also comprises polymerized units of ethylene and α-olefin, wherein the average block index is greater than 0 but less than about 0.4 and a molecular weight distribution, Mw/Mn, greater than about 1.3, and preferably wherein the average block index is in the range from about 0.1 to about 0.3 or more preferably wherein the average block index is in the range from about 0.4 to about 1.0, even more preferably wherein the average block index is in the range from about 0.3 to about 0.7, yet more preferably wherein the average block index is in the range from about 0.6 to about 0.9, and optimally wherein the average block index is in the range from about 0.5 to about 0.7.

The interpolymer can have a density of less than about 0.91 g/cc and desirably a density in the range from about 0.86 g/cc to about 0.91 g/cc.

The α-olefin can be styrene, propylene, 1-butene, 1-hexene, 1-octene, 4-methyl-1-pentene, norbornene, 1-decene, 1,5-hexadiene, or a combination thereof. Preferably, the α-olefin is 1-butene or 1-octene.

Desirably, the ethylene/α-olefin interpolymer can have a Mw/Mn greater than about 1.5, desirably, greater than about 2.0, preferably from about 2.0 to about 8, and more preferably from about 1.7 to about 3.5.

The ethylene/α-olefin interpolymer can also be characterized by at least one melting point, Tm, in degrees Celsius, and a density, d, in grams/cubic centimeter, wherein the numerical values of Tm and d correspond to the relationship:

$$Tm > -2002.9 + 4538.5(d) - 2422.2(d)^2$$

The ethylene/α-olefin interpolymer can also be characterized by an elastic recovery, Re, in percent at 300 percent strain and 1 cycle measured with a compression-molded film of the ethylene/α-olefin interpolymer, and a density, d, in grams/cubic centimeter, wherein the numerical values of Re and d satisfy the following relationship when ethylene/α-olefin interpolymer is substantially free of a cross-linked phase:

$$Re > 1481 - 1629(d)$$

The interpolymer can also be characterized by having at least one fraction obtained by Temperature Rising Elution Fractionation ("TREF"), wherein the fraction has a block index greater than about 0.3 and up to about 1.0 and the ethylene/α-olefin interpolymer has a molecular weight distribution, Mw/Mn, greater than about 1.3.

The interpolymer can also be characterized by having at least one fraction obtained by TREF, wherein the fraction has a block index greater than about 0 and up to about 0.4 and the ethylene/α-olefin interpolymer has a molecular weight distribution, Mw/Mn, greater than about 1.3.

Desirably, the block index of the fraction is greater than about 0.4, more desirably greater than about 0.5, preferably greater than about 0.6, more preferably greater than about 0.7, even more preferably greater than about 0.8, yet more preferably greater than about 0.9.

The interpolymer can have an ethylene content is greater than 50 mole percent with one or more hard segments and one or more soft segments.

Desirably, the hard segments are present in an amount from about 5% to about 85% by weight of the interpolymer.

Desirably, the hard segments comprise at least 98% of ethylene by weight. Desirably, the soft segments comprise less than 90% of ethylene by weight. Also desirably, the soft segments comprise less than 50% of ethylene by weight.

Preferably, the interpolymer comprises at least 10 hard and soft segments connected in a linear fashion to form a linear chain. Even more preferably, the hard segments and soft segments are randomly distributed along the chain. Most preferably, the hard segments do not include a tip segment. Alternatively, the soft segments do not include a tip segment.

The ethylene/alpha-olefin interpolymers useful in the present invention are commercially available from Dow Chemical Company of Midland, Mich. Two grades are particularly preferred: D9100 and D9007.10, particularly together because of the balance of physical and rheological properties.

Ratio of SBC to OBC Non-Crosslinked Elastomers

The weight percentage of SBC compared with the weight percentage of OBC in the TPE compound can range from about 0 to about 100 and preferably from about 0.58:1 to about 0.65:1. Operating with these ranges allows the non-crosslinked elastomers to bond to HDPE or PP and operate with desirable melt strength during processing and desirable "soft tough" surface feel during performance use.

Non-Elastomeric Olefin Polymer

Both non-crosslinked elastomers are used in the present invention with an olefin polymer, which can include any olefin polymer selected from the group consisting of copolymer of polyethylene such as high density polyethylene (HDPE), medium density polyethylene (MDPE), low density polyethylene (LDPE), linear low density polyethylene (LLDPE), very low density polyethylene (VLDPE); a homopolymer of propylene; and a random copolymer of propylene and ethylene; and combinations thereof. Generally, any polyolefin polymer(s) suitable for modifying the compounds to a desirable viscosity range is a candidate for use in the present invention.

Homopolymers of propylene (hPP) are commercially available and any of them is a candidate for use in this invention.

The hPP can have a melt index value according to ASTM D 1238 (at 230° C. with 2.16 Kg) ranging from about 0.5 to about 2000, and preferably from about 4 to about 50 g/10 min; a tensile strength at yield according to ASTM D 638 (50 mm/min) ranging from about 15 to about 50, and preferably from about 20 to about 40 MPa; an elongation at break according to ASTM D 638 (50 mm/min) ranging from about 1 to about 500, and preferably from about 10 to about 300 MPa; a flexural modulus according to ASTM 790 ranging from about 300 to about 3000, and preferably from about 500 to about 2000 MPa; a Notched-Izod impact strength according to ASTM D 256 ranging from about 0.2 to about 10, and preferably from about 0.5 to about 5 ft-lb/in; a Heat-Deflection Temperature according to ASTM D648 (at 66 psi) ranging from about 60 to about 150, and preferably from about 70 to about 120° C.

Presently preferred as a commercially available hPP are a combination of hPP resins from Lyondell-Basell and Formosa Plastics, namely: Profax PD702 (MFI=35) and Formolene 1102KR (MFI=4), respectively. A mixture of these two different hPPs is preferred because of the balance of melt strength and rheological properties.

Random polypropylene copolymers (rPP) are commercially available and any of them is a candidate for use in this invention. The comonomer can be selected from the group consisting of ethylene or butene.

The rPP can have a melt index value according to ASTM D 1238 ranging from about 0.5 to about 200, and preferably from about 4 to about 50 g/10 min; a tensile strength at yield according to ASTM D 638 (50 mm/min) ranging from about 15 to about 50, and preferably from about 20 to about 40 MPa; an elongation at break according to ASTM D 638 (50 mm/min.) ranging from about 1 to about 500, and preferably from about 10 to about 300%; a flexural modulus according to ASTM 790 ranging from about 300 to about 3000, and preferably from about 500 to about 2000 MPa; a Notched-Izod impact strength according to ASTM D 256 ranging from about 0.2 to about 10, and preferably from about 0.5 to about 5 ft-lb/in; a Heat-Deflection Temperature according to ASTM D648 (at 66 psi) ranging from about 60 to about 150, and preferably from about 70 to about 120° C.

Presently preferred as a commercially available rPP is TotalFina 7823M Polypropylene Random Copolymer Resin from Total (MFI=30).

Both rPP and hPP can optionally be nucleated to improve their properties of rate of crystallization and clarity.

The various densities of polyethylene are also candidates and readily commercially available.

Any polyethylene can be used as long as its melt flow is between 0.5 and 10 g/10 min. HDPE can have a melt index value according to ASTM D 1238 (at 190° C. with 2.16 Kg) ranging from about 0.02 to about 55, and preferably from about 0.9 to about 10 g/10 min; a tensile strength at yield according to ASTM D 638 (50 mm/min) ranging from about 2000 to about 4500, and preferably from about 3000 to about 4200 psi; an elongation at break according to ASTM D 638 (50 mm/min) ranging from about 50 to about 1200, and preferably from about 600 to about 700%; a flexural modulus according to ASTM 790 ranging from about 130,000 to about 220,000, and preferably from about 150,000 to about 185,000 psi; a Heat-Deflection Temperature according to ASTM D648 (at 66 psi) ranging from about 140 to about 170, and preferably from about 160 to about 169° F.

LDPE can have a melt index value according to ASTM D 1238 ranging from about 0.5 to about 200, and preferably from about 0.7 to about 7 g/10 min; a tensile strength at yield according to ASTM D 638 (50 mm/min) ranging from about 900 to about 4800, and preferably from about 1800 to about 3500 psi; an elongation at break according to ASTM D 638 (50 mm/min) ranging from about 100 to about 800, and preferably from about 500 to about 750%; with the rest of the properties of LDPE not being reported and not being significantly important.

Generally, the selection of the non-elastomeric olefin polymer should match or at least be generally compatible or blendable with the olefin polymer with which the TPE will be co-extruded.

Optional Softening Oil

Optionally, when needed for establishment of a particular Shore

A hardness, the TPE compound is made more flexible by the use of a softening oil. The oil can be any commercially available oil which can plasticize and render more flexible a TPE, so as to permit both co-extrusion and blow molding thermoplastic processing operations.

Non-limited examples of commercially acceptable softening oils include synthetic oil, mineral oil, and combinations thereof, with the mineral oil being presently preferred because of its availability and cost.

Viscosities of the softening oil can range from about 10 to about 105 and preferably from about 80 to about 105 cSt at 40° C., as determined by a method prescribed in ASTM D0445.

Ratio of Elastomers to Softening Oil

The ratio of elastomers to softening oil is significant to the usefulness of TPE compounds of the present invention as co-extrusion/blow molding candidates with the blow moldable polyolefin. In order to be both co-extrudable and blow moldable, the TPE compound can not have too much softening oil.

Regardless of the ratio of the two different non-crosslinked elastomers (SBC and OBC), when softening oil is used, the combination of their weight percentages in the TPE compound, compared with the weight percentage of the softening oil(s), is at least 1.5:1.0 and desirably at least 2.0:1.0 and preferably at least 2.5:1.0 and even more preferably at least 5.0:1.0.

As seen in the Examples below, it is possible to achieve the goal of a co-extrudable, blow-moldable TPE compound without any softening oil at all, if one is willing to operate within a higher range of Shore A hardness values.

Optional Additives

The compound of the present invention can include conventional plastics additives in an amount that is sufficient to obtain a desired processing or performance property for the compound. The amount should not be wasteful of the additive or detrimental to the processing or performance of the compound. Those skilled in the art of thermoplastics compounding, without undue experimentation but with reference to such treatises as *Plastics Additives Database* (2004) from Plastics Design Library (www.williamandrew.com), can select from many different types of additives for inclusion into the compounds of the present invention.

Non-limiting examples of optional additives include adhesion promoters; biocides (antibacterials, fungicides, and mildewcides), anti-fogging agents; anti-static agents; bonding, blowing and foaming agents; dispersants; fillers and extenders; smoke suppressants; impact modifiers; initiators; lubricants; micas; pigments, colorants and dyes; optical brighteners; plasticizers; processing aids; other polymers; release agents; silanes, titanates and zirconates; slip and anti-blocking agents; stabilizers; stearates; ultraviolet light absorbers; viscosity regulators; waxes; and combinations of them.

A preferred anti-oxidant is an Irganox brand pentaerythritol tetrakis(3-(3,5-di-tert-butyl-4-hydroxyphenyl)propionate) antioxidant identified as CAS 6683-19-8. A preferred processing stabilizer is an Irgafos brand tris (2,4-di-(tert)-butylphenyl)phosphite processing stabilizer identified as CAS No. 31570-04-4.

Processing of the TPE through extruders and molding machines can benefit from the presence of an external lubricant, such as a wax, preferably an erucamide wax commercially available from Chemtura under the brand of Kemamide E wax.

Table 1 shows the acceptable, desirable, and preferable ranges of ingredients for the co-extrudable TPE of the present invention.

TABLE 1

Ranges of Ingredients

| Ingredient (Wt. Percent) | Acceptable | Desirable | Preferable |
|---|---|---|---|
| Non-elastomeric olefin | 6-12 | 7-11 | 8-10 |
| SBC Non-crosslinked elastomer | 20-35 | 22-34 | 24-28 |
| OBC Non-Crosslinked elastomer | 38-54 | 38-48 | 40-47 |
| Optional softening oil | 0-35 | 15-30 | 20-25 |
| Optional anti-oxidant | 0-0.3 | 0.1-0.2 | 0.1 |
| Optional lubricant wax | 0-0.1 | 0.05-0.09 | 0.08 |
| Other optional Additives | 0-20 | 0.1-10 | 0.1-5 |

Processing

The preparation of compounds of the present invention is uncomplicated once the proper ingredients have been selected. The compound of the present can be made in a continuous operation.

Mixing in a continuous process typically occurs in an extruder that is elevated to a temperature that is sufficient to melt the polymer matrix with addition of all additives at the feed-throat, or by injection or side-feeders downstream. Extruder speeds can range from about 50 to about 1200 revolutions per minute (rpm), and preferably from about 300 to about 500 rpm. Typically, the output from the extruder is pelletized for later co-extrusion and then blow molding into polymeric articles.

Subsequent extrusion or molding techniques are well known to those skilled in the art of thermoplastics polymer engineering. Without undue experimentation but with such references as "Extrusion, The Definitive Processing Guide and Handbook"; "Handbook of Molded Part Shrinkage and Warpage"; "Specialized Molding Techniques"; "Rotational Molding Technology"; and "Handbook of Mold, Tool and Die Repair Welding", all published by Plastics Design Library (www.williamandrew.com), one can make articles of any conceivable shape and appearance using compounds of the present invention.

In the present invention, the TPE compounds are formulated to co-extrude with a blow moldable polyolefin.

A multi-layer, extrusion, blow molding process is commonly used to produce bottles or other containers with enhanced barrier or chemical resistance properties. The present invention uses this same process to apply a film of TPE compound onto at least a portion of the outer surface of the blow molded polyolefin plastic article, most often a bottle or container, in order to enhance tactile feel, appearance, and/or scent of that portion of the outer surface covered by the TPE compound.

Typically, TPE compounds are too low in melt strength to be considered for blow molding. However, with TPE compounds of the present invention employing two different non-crosslinked elastomers, it is possible to co-extrude the TPE with a stiffer, higher melt strength blow moldable polyolefin or other stiffer higher melt strength thermoplastic.

It is has been noted that, because the TPEs of the present invention can "ride" upon the stiffer blow moldable polyolefin during co-extrusion and then achieve a bonded interface with that polyolefin after blow molding, formulators can not only enhance the tactile feel, appearance, and/or scent of a blow molded plastic article but also customize grip properties required in a variety of different environments to which the blow molded article can be exposed. For example, the Shore A hardness desired for a plastic article may be quite different for that article in a dry vs. wet vs. humid environment.

TPEs of the present invention require specific characteristics in order to be both co-extrudable and blow moldable as an outer layer on at least a portion of the blow molded polyolefin plastic substrate. To be blow moldable, the TPEs of the present invention should have a desired melt viscosity and affinity/compatibility to the melt of the substrate polyolefin plastic, in order that the act of blow molding of the polyolefin plastic is not constrained by the TPE compound. To minimize delamination, the TPE should form a strong bond to the blow moldable polyolefin. This bond is much more probable when the non-elastomer polyolefin of the TPE compound is the same as, or miscible with, the blow moldable polyolefin substrate layer during co-extrusion.

Co-extrusion and Blow Molding

TPEs of the present invention have been found to be most suitable for co-extrusion and blow molding with HDPE. Equipment used to co-extrude different thermoplastics into at least two layers and then blow mold those layers into a final plastic article are well known to those persons having ordinary skill in the plastics processing art, particularly in the blow molded bottle/container market. Particularly preferred as a manufacturer of co-extrusion/blow molding equipment is Kautex Machinebau of Bonn, Germany. Its website, www.kautex-group.com/en, offers valuable information to a person having ordinary skill in the art to select from shuttle blow molding machines, industrial blow molding machines, 3D blow molding machines, etc. As many as six separate layers can be co-extruded with as much as a 10,000 liter volume plastic article capable of being blow-molded using the Kautex machines.

As with any co-extrusion, any number of techniques can be employed. With careful selection of dies and machine settings, it is possible to provide for the amount of outer surface of the substrate to be covered by TPE of the present invention to be at little as 1% surface area to as much as 100% of the surface area. The configuration of co-extrusion dies can provide striping (axial), intermittent patching (radial), or swirling (both) of the TPE layer on to the blow moldable polyolefin substrate.

It is also feasible to co-extrude more than one type of TPE of the present invention on to the outer surface of the substrate, such that two different tactile gripping surfaces can co-exist on the surface of the blow molded plastic article. For example, one gripping surface may be used for the top of a container for manual pressure to unscrew a cap, while a second gripping surface can be used for the location of the container to be held while pouring liquid from the container.

Different colors of the same or different TPE types can also add aesthetic or functional attributes or both to the plastic article. For example, one part of the outer surface of a plastic article could be covered with a red TPE (designating danger) and another part of the surface of the plastic article could be covered with a green TPE (designating safety).

The co-extruded intermediate TPE/polyolefin can immediately proceed to blow molding or can be stored for later blow molding. The intermediate product can be a sheet or a parison or other shape known to those skilled in the art.

The TPE layer on the final blow molded plastic article can have a thickness, where located on and bonded to the plastic substrate, ranging from about 20 to about 200 μm and preferably from about 25 to about 80 μm.

To provide adequate support of the desired plastic article and yet add a gripping surface on at least a portion on the outer surface of that plastic article, the thickness percentage ratio of blow moldable polyolefin to TPE can range from about 85/15 to about 97/3, desirably from about 87/13 to about 97/3 and preferably from about 90/10 to about 97/3. A thickness ratio of 97/3 is approaching the current limits of co-extrusion blow molding machines, but if that industry advances, then the thickness ratio can increase to 98/2, to 99/1, or even higher.

With confidence of bonding of the co-extruded layers to then be blow-molded into shapes of any type, a person having ordinary skill in the blow molding art can design and produce any number of plastic articles having any number of "soft touch" gripping surfaces to satisfy the needs of the consumers during use of the plastic articles.

Embodiments of the invention are explained in the following examples.

EXAMPLES

Table 2 shows the sources of ingredients for Examples 1-5 of the present invention and Comparative Example A. Table 3 shows the formulations and resulting properties.

Each Example and Comparative Example was melt-mixed in a twin screw extruder operating in heating zones progressing through a range of 160° C.-232° C. (320° F.-450° F.) and rotating at a speed of 400 rpm. The TPE compound extrudate was pelletized for subsequent co-extrusion and blow molding.

TABLE 2

| Ingredients | | | |
|---|---|---|---|
| Ingredient Name | | Commercial Source | |
| Kraton G1650 | Hydrogenated SBC | Kraton Polymer | Houston, TX |
| Kraton G1654 | Hydrogenated SBC | Kraton Polymer | Houston, TX |
| D9107 | Olefinic block copolymer | Dow | Midland, MI |
| D9507 | Olefinic block copolymer | Dow | Midland, MI |
| D9100 | Olefinic block copolymer | Dow | Midland, MI |
| 550 Viscosity White oil | Mineral oil | PetroCanada Lubricant | Mississauga, Ontario |
| Sclair19H | HDPE | Nova Chemicals | Pittsburgh, PA |
| Sclair 2908 | HDPE | Nova Chemicals | Pittsburgh, PA |
| Kemamide E | Erucamide lubricant | Chemtura | Middlebury, CT |
| Chemstat G118 | Glyceride | PCC Chemax | Piedmont, SC |
| Irganox 1010 | Antioxidant | Ciba | Terrytown, NY |
| Irgafos 168 | Antioxidant | Ciba | Terrytown, NY |

TABLE 3

| Ingredient | Example 1 | 2 | 3 | 4 | 5 | A |
|---|---|---|---|---|---|---|
| Kraton G1650 | 24.7 | 28.18 | 0 | 33.93 | 22.82 | 19.79 |
| Kraton G1654 | 0 | 0 | 33.93 | 0 | 0 | 0 |
| D9107 | 41.17 | 46.97 | 21.54 | 0 | 38.04 | 32.98 |
| D9507 | 0 | 0 | 32.31 | 0 | 0 | 0 |
| D9100 | 0 | 0 | 0 | 53.85 | 0 | 0 |
| SBC/OBC Ratio | 0.60 | 0.60 | 0.63 | 0.63 | 0.60 | 0.60 |
| 550 Viscosity White oil | 24.7 | 14.09 | 0 | 0 | 30.43 | 39.58 |
| TPE/Oil Ratio | 2.67 | 5.33 | Inf. | Inf. | 2.00 | 1.33 |
| Sclair19H | 9.06 | 10.33 | 5.39 | 0 | 8.37 | 7.26 |
| Sclair 2908 | 0 | 0 | 6.46 | 11.85 | 0 | 0 |
| Kemamide E | 0.12 | 0.14 | 0.16 | 0.16 | 0.11 | 0.1 |
| Chemstat G118 | 0.08 | 0.09 | 0 | 0 | 0.08 | 0.1 |
| Irganox 1010 | 0.08 | 0.09 | 0.11 | 0.11 | 0.08 | 0.1 |
| Irgafos 168 | 0.08 | 0.09 | 0.11 | 0.11 | 0.08 | 0.1 |
| Total | 99.99 | 99.98 | 100.01 | 100.01 | 100.01 | 100.01 |
| Shore A Hardness (ASTM D2240, 10 s delay) | 52 | 60 | 67 | 79 | 45 | 35 |
| Specific Gravity (ASTM D792) | 0.88 | 0.88 | 0.88 | 0.88 | 0.88 | 0.88 |
| Tensile Strength, psi (ASTM D412, Die C) | 564 | 682 | 726 | 902 | 465 | 454 |
| Elongation, % (ASTM D412, Die C) | 840 | 705 | 703 | 888 | 926 | 1023 |
| Viscosity at 67/sec shear rate and 200° C. (Pa · s) | 1247 | 1993 | 1781 | 1580 | 884 | 483 |
| Peel Strength (pounds per linear inch using an Instron Tensile Testing Machine) of a 0.158 cm thick TPE layer from a 0.158 cm thick HDPE layer | 25.5 | 23.6 | 22 | 20 | 21.2 | 12.7 |

A review of Examples 1-5 vs. Comparative Example A shows the variety of acceptable TPE compounds represented by Examples 1-5. While the specific gravities of all Examples 1-5 and Comparative Example A were the same, a variety of Shore A hardnesses were produced with a variety viscosities.

What made Examples 1-5 acceptable was the limited amount of softening oil, as demonstrated by the ratio for Examples 1-5 of TPE:Oil being greater than 1.5:1.0.

The linear peel strength also demonstrated the inadequacy of Comparative Example A, because the bond strength was too weak causing easier de-lamination from the molded HDPE plaque surface.

To test the properties, the pellets of Examples 1-3 were co-extruded with HDPE at a weight percent ratio for HDPE/TPE of 87/13 and then blow molded into containers of 800 µm thickness and 200 ml volume using a rebuilt laboratory scale Kautex Magic 500 co-extrusion blow molding machine.

Each of the feed-streams of Examples 1-3 for the outer layer and HDPE for the inner layer had between 2 and 3 parts of color concentrate per hundred parts of HDPE and TPE, respectively, to provide coloration for the blow molded bottle, according to Table 4.

TABLE 4

| Example | Layer | Polymer | Colorant[2] |
|---|---|---|---|
| 6 | Outer Layer | Example 1 | 3 phr of CC10120150BG gray |
|   | Inner Layer | MDPE[1] | 3 phr of CC10120150BG gray |
| 7 | Outer Layer | Example 2 | 3 phr of CC10126376BG green |
|   | Inner Layer | MDPE[1] | 3 phr of CC10126376BG green |
| 8 | Outer Layer | Example 3 | 2 phr of CC10120569BG black |
|   | Inner Layer | MDPE[1] | 2 phr of CC10120569BG black |

[1]Rigidex ® 5502S MDPE from Ineos
[2]PolyOne Corporation

The parameters for the co-extrusion blow molding appear in Table 5 for all of Examples 6-8.

TABLE 5

Co-Extrusion and Blow Molding Conditions for Examples 6-8 200 ml Bottle

| Parameter | Inner Layer | Outer Layer |
|---|---|---|
| Extruder Screw Diameter (mm) | 50 | 30 |
| Extruder Screw Speed (rpm) | 14 | 4 |
| Zone A Temp. (° C.) | 170 | |
| Zone B Temp. (° C.) | 175 | |
| Zone C Temp. (° C.) | 175 | |
| Zone D Temp. (° C.) | 180 | |
| Zone E Temp. (° C.) | 180 | |
| Zone F Temp. (° C.) | 180 | |
| Zone G Temp. (° C.) | 180 | |
| Zone H Temp. (° C.) | 180 | |
| Zone I Temp. (° C.) | | 150 |
| Zone J Temp. (° C.) | | 150 |
| Zone K Temp. (° C.) | | 155 |
| Circular Die Diameter (mm) | 20 | |
| Compressed Air at Exit (MPa) | 0.7 | |
| Thickness Ratio-Inner Layer/Outer Layer | 87/13 | |
| Thickness (µm) | 696 | 104 |

Examples 6-8 all resulted in excellent 200 ml bottles having a "soft touch" gripping surface covering the MDPE substrate or inner layer. The co-extrusion thickness ratio of 87/13 provided enough subtrate layer thickness for integrity and physical stability of the container and also provided a well-bonded TPE outer surface which provided enough gripping surface and "soft touch" to be very useful for consumer and industrial uses where the polyethylene itself might be too smooth or slippery for safe or convenient use.

Because the ability to enhance the feel of the outer surface of a HDPE container is limited, the presence of the TPE outer layer, at least on a portion of the outer surface of the HDPE container, enhances the grip characteristics of the container.

The viscosity of Comparative Example A was too low to be either co-extruded or blow molded with the HDPE.

Conversely, Examples 6-8 produced acceptable gripping layers on the MDPE. The variations in types of SBC and OBC and the variations of amount of those elastomers in comparison with the softening oil demonstrate to a person having ordinary skill in the art, that without undue experimentation, a particular hardness/softness of a gripping surface can be tailored to the needs of the particular blow-moldable polyolefin plastic articles. Example 3 performed well as the outer layer of Example 8, even though no softening oil was employed. The higher Shore A hardness values were also achieved. Thus, a customer can choose a TPE which exhibits a specific surface feel for the end use product from a number of different Shore A hardness values.

An experiment similar to that of Examples 6-8 was conducted using an industrial scale Kautex co-extrusion blow-molding machine with multiple of inner layers of Lupolen 5021 D HDPE from LyondellBasell Industries and an outer layer of TPE of the invention, each layer having 2 phr of blue colorant. The thickness ratio was 97/3. A blow molded consumer container of approximately 1 liter in size was molded, having a complex curvature geometry of in-molded gripping handle, contoured sidewalls, and pouring spout completely covered with TPE of the present invention. The resulting container had a "soft touch" gripping surface.

TPEs of the present invention can now provide a "soft touch" gripping surface to an otherwise smooth or slippery surface of a polyolefin plastic article. The present invention now makes it possible for blow-molded plastic articles to benefit from the surface application of TPEs as injection molded articles have previously employed. The ability to formulate a TPE to be co-extrudable with, blow-molded with, and bondable to a polyolefin substrate opens entirely new product categories for blow-molded polyolefin articles.

The invention is not limited to the above embodiments. The claims follow.

What is claimed is:

1. A co-extrudable thermoplastic elastomer compound, comprising:
    (a) a non-elastomeric polyolefin;
    (b) a first non-crosslinked elastomer;
    (c) a second non-crosslinked elastomer; and
    (d) a softening oil in an amount of from about 20 to about 25 weight percent of the compound,
    wherein the compound has a weight percent ratio of elastomers to oil, when present, of at least 1.5:1.

2. The compound of claim 1, wherein the first non-crosslinked elastomer is styrene block copolymer and wherein the second non-crosslinked elastomer is olefin block copolymer.

3. The compound of claim 1, wherein the non-elastomeric polyolefin is selected from the group consisting of polypropylene homopolymer, and polypropylene random copolymer, high density polyethylene, medium density polyethylene, low density polyethylene, linear low density polyethylene, very low density polyethylene, and combinations thereof.

4. The compound of claim 1, wherein the non-elastomeric polyolefin is high density polyethylene or medium density polyethylene.

5. The compound of claim 1, wherein the non-elastomeric polyolefin is polypropylene random copolymer.

6. The compound of claim 1, wherein the compound has a weight percent ratio of elastomers to oil, when present, is at least 2.0:1.

7. The compound of claim 1, wherein the compound has a weight percent ratio of elastomers to oil, when present, is at least 2.5:1.

8. The compound of claim 6, further comprising plasticizer oil, anti-oxidant, optical brightener, and lubricant wax and wherein amounts of polyolefin, elastomers, anti-oxidant, and lubricant in weight percent of compound are:

| | |
|---|---|
| Non-elastomeric olefin | 7-11 |
| SBC Non-crosslinked elastomer | 22-34 |
| OBC Non-Cros slinked elastomer | 38-48 |
| Optional anti-oxidant | 0.1-0.2 |
| Optional lubricant wax | 0.05-0.09. |

9. A multi-layer, blow molded thermoplastic elastomer article comprising:
    a layer of polyolefin having an outer surface and
    a layer of the compound of claim 1 covering at least a portion of the outer surface of the polyolefin layer.

10. The article of claim 9, wherein the article is blow molded after a co-extrusion of the layer of polyolefin with a layer of the compound.

11. The article of claim 9, wherein the layer of the compound covers from 1% to 100% of surface area of the outer surface of the polyolefin layer.

12. The article of claim 9, wherein the layer of the compound covers a patch of surface area of the outer surface of the polyolefin layer.

13. The article of claim 9, wherein the layer of the compound covers a stripe of surface area of the outer surface of the polyolefin layer.

14. The article of claim 9, wherein the layer of the compound covers a swirl of surface area of the outer surface of the polyolefin layer.

15. The article of claim 9, wherein more than one type of compound covers the outer surface of the polyolefin layer.

16. The article of claim 9, wherein the thickness ratio of polyolefin to compound for the article ranges from about 85/15 to about 97/3.

17. The article of claim 9, wherein the thickness of the compound on the outer surface of the polyolefin layer ranges from about 20 µm to about 200 µm.

18. The article of claim 9, wherein the compound has a Shore A hardness after 10 seconds of delay ranging from about 45 to about 80 and wherein the compound has a viscosity at 67/sec shear rate and 200° C. of greater than 880 Pa·s (Pascal-seconds).

19. The article of claim 9, wherein the article has a complex curvature geometry.

* * * * *